Sept. 20, 1971 G. M. HARGREAVES 3,606,230
CARTOP LOAD SUPPORTING DEVICE
Filed June 13, 1969 2 Sheets-Sheet 1

INVENTOR.
GEORGE M. HARGREAVES
BY
*Learman, Learman & McCulloch*

Sept. 20, 1971  G. M. HARGREAVES  3,606,230
CARTOP LOAD SUPPORTING DEVICE

Filed June 13, 1969  2 Sheets-Sheet 2

INVENTOR.
GEORGE M. HARGREAVES
BY

United States Patent Office 3,606,230
Patented Sept. 20, 1971

3,606,230
CARTOP LOAD SUPPORTING DEVICE
George M. Hargreaves, 124 Larch St.,
Saginaw, Mich. 48602
Filed June 13, 1969, Ser. No. 833,124
Int. Cl. B60r 9/04
U.S. Cl. 248—346                    9 Claims

ABSTRACT OF THE DISCLOSURE

A cartop load carrying device comprises an elongated, hollow tubular member of triangular cross-section formed from a blank of corrugated paper or the like and having its cartop engaging side bowed longitudinally to conform substantially to the curvature of the cartop.

The invention disclosed herein relates to a disposable load supporting device of the kind especially adapted for removable installation in pairs atop an automobile so as to enable the vehicle to transport goods such as lumber, wallboard, ladders and the like even though such goods are too large to be carried conveniently inside the car or its trunk.

Load supporting devices of the general class to which the invention pertains have been proposed heretofore, but have not been altogether satisfactory for a number of reasons. For example, the previously known devices do not take into account the side to side curvature of the top of a conventional vehicle with the result that such devices engage the cartop at a single point between the ends of such devices, thereby subjecting the devices themselves and the cartop to substantial concentration of forces. The single point engagement of the supporting devices with the cartop also complicates the installation of the devices on the vehicle inasmuch as the devices tend to act as weathervanes and rotate in the wind. In addition to the foregoing, others of the known load supporting devices for similar purposes have been either too expensive to be truly disposable or, alternatively, have been of rather fragile construction, thereby being incapable of supporting loads of the kind frequently encountered.

An object of this invention is to provide a cartop load carrying device which overcomes the disadvantages of known devices for similar purposes.

Another object of the invention is to provide a cartop load carrying device formed from a blank of inexpensive material and which, when conditioned for use, has a cartop engaging surface which conforms substantially to the curvature of the top of the automobile on which it is adapted to be mounted.

A further object of the invention is to provide a device of the character referred to which may be shipped and stored in flat condition, thereby conserving shipping and storage space, but which may be converted to usable condition simply and without the necessity of using any tools or fastening devices.

Another object of the invention is to provide improved means for removably securing a cartop load carrying device on a vehicle.

Other objects and advantages of the invention will be pointed out specifically or will become apparent from the following description when it is considered in conjunction with the appended claims and the accompanying drawings, in which:

Figure 1:
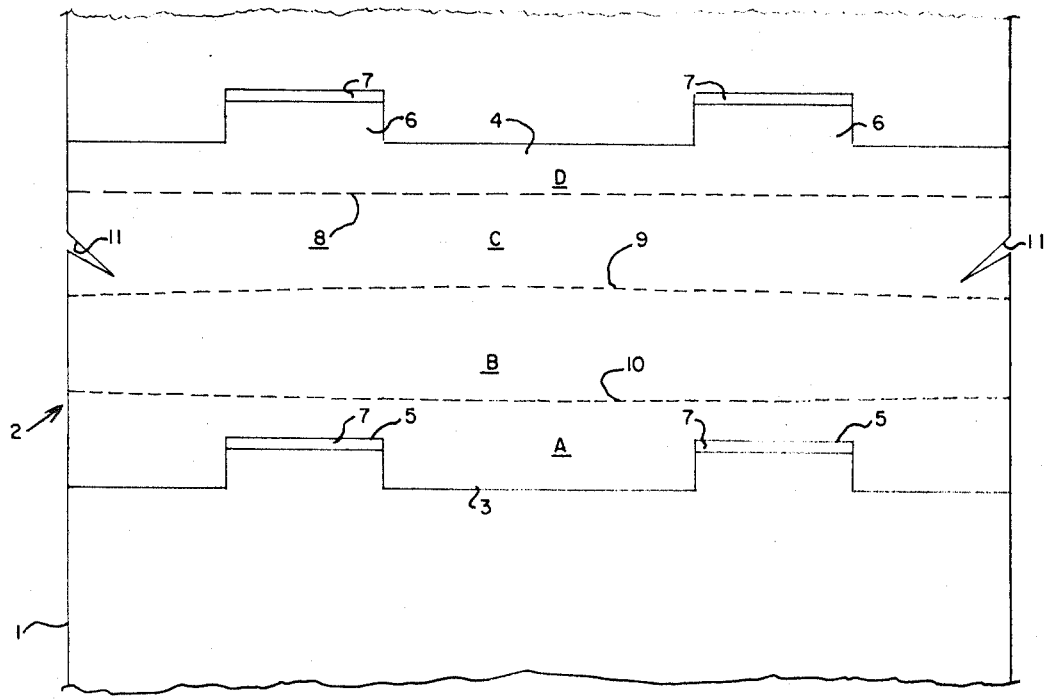
FIG. 1 is a fragmentary, plan view of a length of stock from which a blank has been cut and scored preparatory to forming a load carrying device in accordance with the invention.
Figure 3:
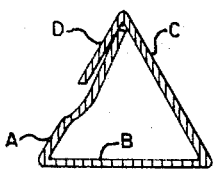
Figure 4:
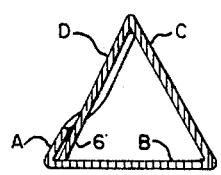
Figure 2:
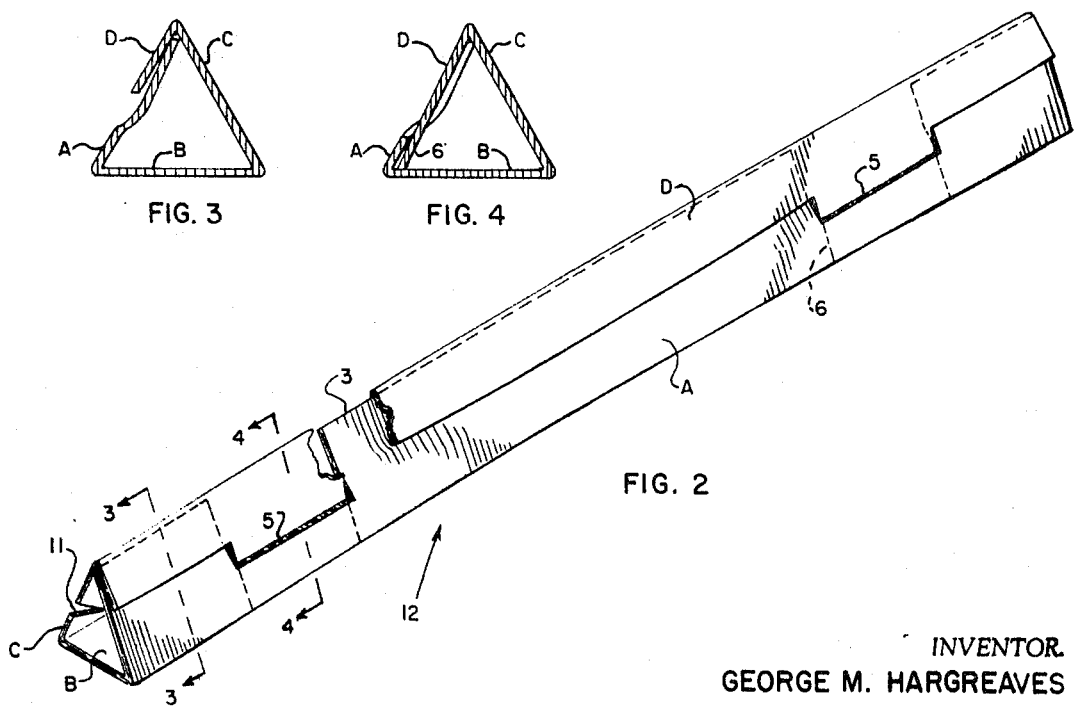
FIG. 2 is an isometric view, with parts broken away, illustrating the blank in assembled, load carrying condition.
Figure 5:
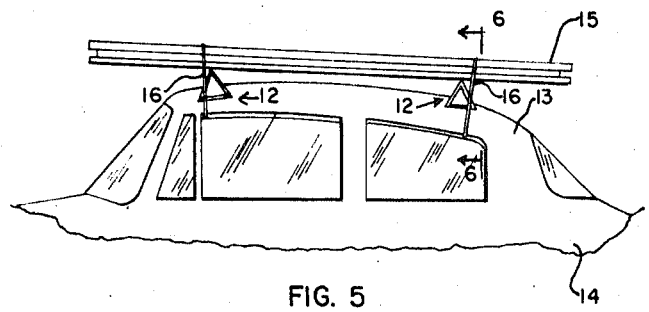
Figure 6:
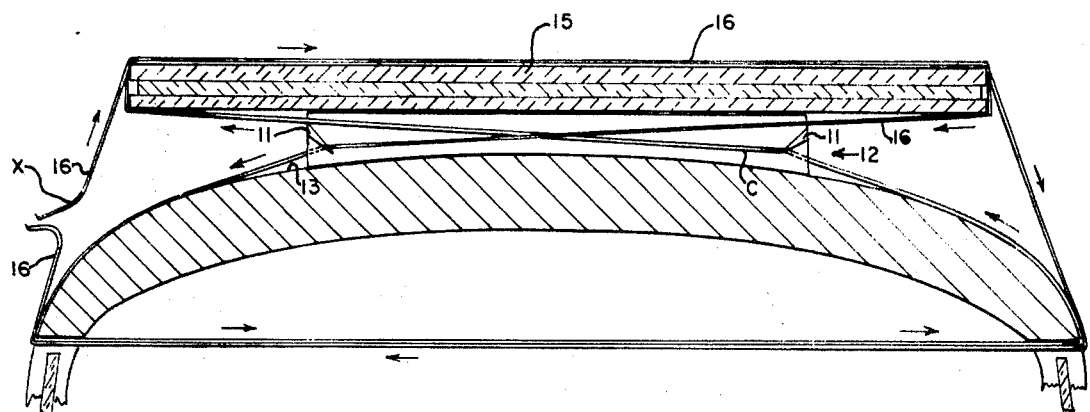

FIGS. 3 and 4 are sectional views taken on the lines 3—3 and 4—4, respectively, of FIG. 2;

FIG. 5 is a fragmentary, side elevational view illustrating a pair of load carrying devices applied to the top of a vehicle and supporting a load; and FIG. 6 is an enlarged, end elevational view of a vehicle illustrating one means of anchoring both the load supporting device and the load to the vehicle.

A load supporting device constructed in accordance with the invention is adapted to be cut from a strip of corrugated paper stock or the like 1 by conventional cutting processes so as to form a flat blank 2 having opposite side edges 3 and 4. In the cutting operation, the edge 3 is provided with a pair of longitudinally spaced notches 5 and the edge 4 is provided with a corresponding number of correspondingly spaced projections or tabs 6. The dimension of the projections 6 transversely of the blank is not as great as the depth of the notches 5, for a reason presently to be explained, so in the cutting operation small strips 7 of waste material are formed.

The blank 2 is provided with a plurality of longitudinally extending scores or creases so as to facilitate folding of the blank to condition it for use. One of the creases is designated by the reference character 8 and extends longitudinally of the blank parallel to the longitudinal axis of the latter. Between its opposite edges, the blank is provided with two additional creases 9 and 10 which are immediately adjacent one another. The creases 9 and 10 do not parallel the longitudinal axis of the blank 2, but instead, are curved or bowed away from one another. Stated differently, the creases 9 and 10 are formed on reverse arcs so that the distance between them is at a maximum at the center of the blank 2. The scores or creases 8, 9 and 10 form a plurality of panels or sides A, B, C and D which are joined one to another.

At each end of the blank 2 is provided a generally wedge-shaped notch or opening 11 adapted for the accommodation of securing means as will be explained in more detail hereinafter.

The blank 2 may be folded along the score lines 8, 9 and 10 so as to form a triangular load supporting tube or device designated generally by the reference character 12. In the folding of the blank, the panel A is folded upwardly along the arcuate crease 10 and the panel C is folded upwardly along the crease 9 so that the panel B forms the bottom or lower side of the device 12 and is concave longitudinally of the device. The panel D then is folded along the score line 8 so as to overlie the free edge of the panel A with the projection 6 overlying the notches 5. The free ends of the tabs 6 may be inserted into the notches 5 so as to lie inwardly of the panel A, and it is to facilitate insertion of the tabs 6 into the notches 5 that the latter are cut more deeply than the projections 6 are wide.

When the panels are folded as disclosed and the tabs 6 are fitted into the notches 5, the device 12 presents the appearance of an isosceles triangle in cross-section with the sides formed by the panel C and by the panels A and D being uniform in height.

An important characteristic of the invention is that the transverse dimension of the panel D, at the projections 6, corresponds substantially to the transverse dimension of the panel A between the notches 5 so that, when the projections 6 are interfitted with the notches 5, the free ends of the projections will abut the creased juncture of the panels A and B adjacent the notches 5 and the free edge 3 of the panel A will abut the creased juncture of the panels C and D. This characteristic is best illustrated in FIGS. 3 and 4. The importance of this construction is that, even though the side constituted by the panels A and D has notches therein, at no point along its length is there less than a full width of material. The provision of notches in one of the walls, therefore, does not prevent that wall from supporting its full share of a load.

When the member 12 assumes its triangular configuration, it may be placed on the side to side convex top 13 of a vehicle 14 so that the member 12 lies athwart the top. The upper edge of the device is level or straight from end to end, due to the crease 8 being parallel to the longitudinal axis of the device, thereby enabling the upper edge of the device to have line contact with the load to be supported. The inwardly bowed or concave bottom B of the body 12 is substantially complementary to the convex upper surface of the top 13, thereby enabling the device 12 to have line contact with the cartop, rather than point contact. The complementary arcuate surfaces of the device 12 and the cartop 13 also prevent weathervaning of the member 12 in the wind.

Load supporting devices constructed according to the invention are adapted to be used in pairs, one of the members being supported near the front of the vehicle top 13 and the other being mounted near the rear thereof. When the members 12 are in place atop the car, a load such as panel members 15 may be placed atop the members 12 and be supported thereby.

The load 15 and the members 12 may be secured to the vehicle in any one of a number of ways. For example, a line 16, starting from the point X (FIG. 6), may be extended across the top of the load 15 from one side of the top 13 toward the other, as is indicated by the arrows, then beneath the load and alongside the device 12 with the line 16 being accommodated in the left hand opening 11 of the member 12. From the left hand opening 11 the line 16 may pass downwardly along the top 13 and through the vehicle body, the line entering and leaving the vehicle interior via the side windows. From the point where the line 16 emerges from the interior of the vehicle it may pass inwardly along the top 13 and be fitted into the right hand opening 11 in the body 12. From the opening 12, the line passes beneath the load, across the top of the latter and back through the interior of the vehicle so as to be tied at the point X to the free end of the line.

The disclosed embodiment is representative of a presently preferred form of the invention but is intended to be illustrative rather than definitive thereof.

I claim:

1. A load supporting device formed from a flat, elongate blank having opposite side edges, said blank having a first crease adjacent one side edge and substantially parallel to the longitudinal axis of said blank, said blank having two other longitudinal creases between the other side edge and said first crease, said other two creases being bowed away from one another, said creases forming panels joined to one another, said panels being folded at said creases to form a hollow tube triangular in cross-section, the panel between said bowed creases constituting the base of the triangle and said first crease constituting the apex of the triangle, said base being concave from end to end of said tube and said apex being straight from end to end of said tube.

2. The device set forth in claim 1 wherein the panel adjacent one edge of said blank has at least one notch therein and wherein the panel adjacent the opposite edge of said blank has at least one tab projecting therefrom and having a free end, the free end of said tab being fitted into said notch.

3. The device set forth in claim 2 wherein the dimension from the free end of said tab to the juncture of the adjacent panel is such that the free end of said tab abuts the juncture between the notched panel and its adjacent panel.

4. The device set forth in claim 1 wherein the panel at the edge of said blank adjacent said first crease has at least one tab having a free end projecting therefrom and wherein the panel at the opposite edge of said blank has at least one notch therein, said free end of said tab being fitted into said notch.

5. The device set forth in claim 4 wherein the dimension from said free end of said tab to the juncture of the adjacent panel is such that the free end of said tab abuts the juncture between the notched panel and its adjacent panel.

6. The device set forth in claim 4 wherein the transverse dimension of said notched panel, except for said notch, corresponds to the transverse dimension of the panel between said base and the tabbed panel, whereby the edge of said notched panel may abut the juncture between said tabbed panel and its adjacent panel.

7. The device set forth in claim 1 wherein the panel adjacent one edge of said blank has a plurality of longitudinally spaced tabs having free ends projecting therefrom, and wherein the panel adjacent the opposite edge of said blank has a corresponding plurality of longitudinally spaced notches therein, the spacing of said tabs and said notches being such that the tabs may be fitted into said notches.

8. The device set forth in claim 7 wherein the transverse dimension of the tabbed panel, at said tabs, corresponds to the transverse dimension of the notched panel, except at said notches, and wherein the transverse dimension of said notched panel, except at said notches, corresponds to the transverse dimension of the panel between said base and the tabbed panel.

9. The device set forth in claim 1 wherein the opposite ends of said tube are slotted to accommodate means for securing said tube on a support.

References Cited

UNITED STATES PATENTS

| | | | |
|---|---|---|---|
| 851,789 | 4/1907 | Alexander | 214—10.5 |
| 2,698,696 | 1/1955 | Strong | 214—10.5 |
| 2,746,624 | 5/1956 | Stueland | 214—131 |
| 2,985,353 | 5/1961 | Force | 229—22 |
| 3,041,643 | 4/1962 | Struble | 229—8X |
| 3,120,914 | 2/1964 | Smith | 224—42.1E |
| 3,198,339 | 8/1965 | Stolarz | 248—459X |
| 3,199,765 | 8/1965 | Locke | 229—22X |
| 3,495,751 | 2/1970 | Moran | 224—42.42X |

FOREIGN PATENTS

| | | | |
|---|---|---|---|
| 302,350 | 12/1954 | Switzerland | 224—42.1F |

ALBERT J. MAKAY, Primary Examiner

U.S. Cl. X.R.

224—42.1F; 248—174, 459; 211—60A